W. BELLAIRS & W. OUGH.
Tire-Tighteners.
No. 144,729. Patented Nov. 18, 1873.
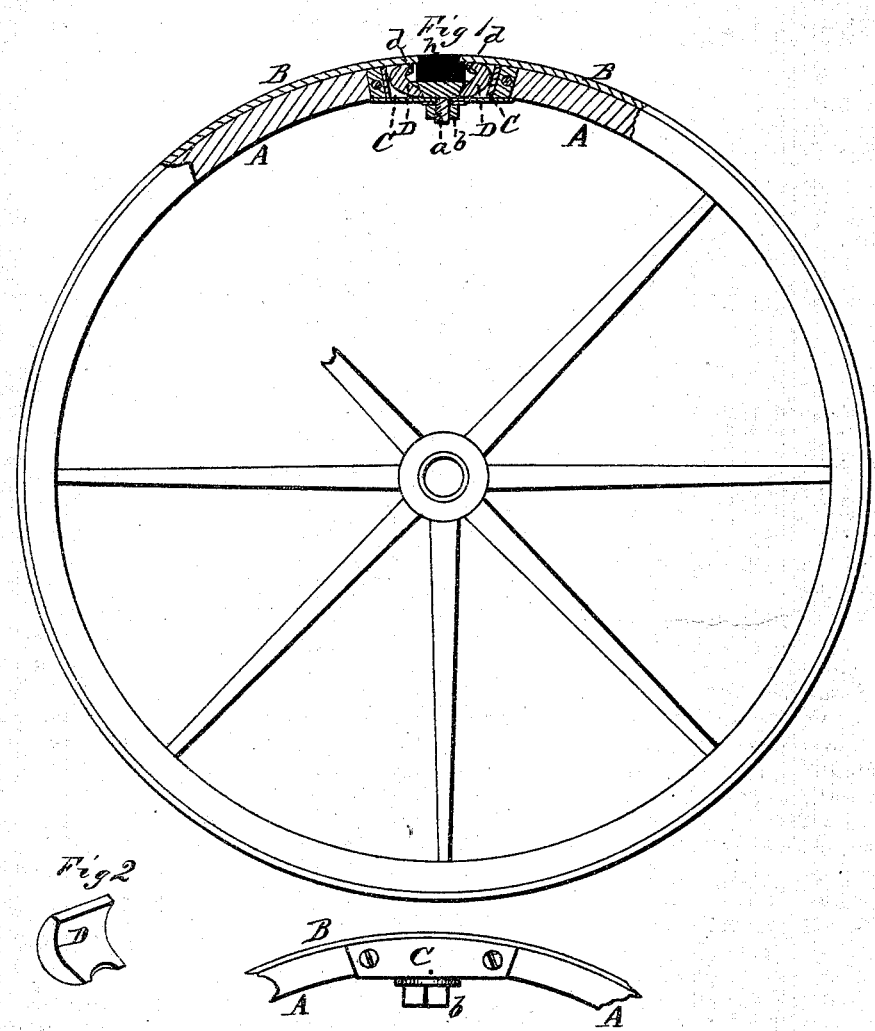

UNITED STATES PATENT OFFICE.

WILLIAM BELLAIRS AND WILLIAM OUGH, OF ATKINSON, ILLINOIS.

IMPROVEMENT IN TIRE-TIGHTENERS.

Specification forming part of Letters Patent No. 144,729, dated November 18, 1873; application filed October 4, 1873.

*To all whom it may concern:*

Be it known that we, WILLIAM BELLAIRS and WILLIAM OUGH, of Atkinson, in the county of Henry and in the State of Illinois, have invented certain new and useful Improvements in Tire-Tighteners; and do hereby declare that the following is a full, clear, and exact description thereof, reference being had to the accompanying drawings and to the letters of reference marked thereon, making a part of this specification.

The nature of our invention consists in the construction and arrangement of a tire-tightener, as will be hereinafter more fully set forth.

In order to enable others skilled in the art to which our invention appertains to make and use the same, we will now proceed to describe its construction and operation, referring to the annexed drawing, in which—

Figure 1 is a side elevation of a wheel with a longitudinal section through the tire-tightener, and Fig. 2 is a perspective view of one of the dogs used in the tightener.

A A represent the fellies of a wheel, and B is the tire surrounding the same. C represents a metal box having a recess formed in each end, into which the adjoining ends of the fellies A A are inserted, so that the box will be held in the felly and form a part thereof. Within the box C are placed two curved dogs, D D, the construction of which is shown in Fig. 2, and between said dogs is placed the beveled head of a bolt, $a$. This bolt passes through the inner side of the box C, and is on its end provided with a nut, $b$. The upper ends of the dogs D D catch on hooks or bent projections $d\ d$ formed upon or attached to the inner side of the tire B—one at each end.

It will readily be seen that, by tightening the nut $b$, the beveled head of the nut $a$ is drawn inward, separating the inner ends of the dogs D D, and the dogs turning, as on fulcrums, their outer ends are drawn toward each other. These ends catching on the hooks $d\ d$ draw the ends of the tire toward each other, thus tightening the same. By this means the tire can be tightened and loosened at pleasure, as the weather may require. When the tire is first put on, and drawn quite tight, there is still an open space left between the ends of the tire. This space is filled up with a piece, $h$, of india-rubber, so as to make a perfect joint.

We are aware that it is not new to tighten the tire of a wagon-wheel by means of a right and left screw-bolt and center nut applied to the bent ends of the tire.

Having thus fully described our invention, what we claim as new, and desire to secure by Letters Patent, is—

The combination, with the fellies A A and tire B, of the box C, dogs D D, bevel-headed bolt $a$, nut $b$, and catches $d\ d$, all substantially as and for the purposes set forth.

In testimony that we claim the foregoing we have hereunto set our hands.

WILLIAM BELLAIRS.
WILLIAM OUGH.

Witnesses:
HUGH × ARMSTRONG,
    his mark
JOHN CHRISTIAN.